Sept. 26, 1950 W. H. STONICH 2,523,974
FISH STRINGER
Filed June 30, 1948

William H. Stonich
INVENTOR.

BY *Clarence A. O'Brien*
*and Harvey B. Jacobson*
Attorneys

Patented Sept. 26, 1950

2,523,974

UNITED STATES PATENT OFFICE 2,523,974

FISH STRINGER

William H. Stonich, Boulder Junction, Wis.

Application June 30, 1948, Serial No. 36,102

3 Claims. (Cl. 224—7)

This invention comprises novel and useful improvements in a fish stringer and more specifically pertains to a device for stringing fish upon a cable and positioning the fish securely but immersed in water to keep the same fresh.

The principal object of this invention is to provide a fish stringer which shall be of simple construction, of light weight, easily applied to or removed from fish, and which shall be highly satisfactory for the purposes intended.

The objects of this invention are attained by a device consisting of a flexible supporting cable provided with means at one end thereof for anchoring the same to the side of a boat, together with a bracket provided with a sleeve frictionally embracing and rigidly secured to a portion of the cable intermediate its ends, the other end of the cable being provided with a pointed terminal for easy insertion through the mouth and gill of a fish, together with a socket carried by the bracket for receiving and retaining the pointed terminal in a parallel relation to the sleeve with the loop of the cable for receiving the fish depending from the sleeve and the socket.

A further feature of the invention resides in the provision of a bracket which shall be of unitary, light weight, sheet metal construction, whereby the same may be struck from a single blank of material and folded upon itself to provide parallel sleeves, one constituting a socket for receiving the cable terminal and the other constituting a frictional means for gripping the cable and anchoring the bracket thereto.

These, together with various ancillary features and objects of the invention which will later become apparent as the following description proceeds, are attained by this device, a preferred embodiment of which has been illustrated by way of example only in the accompanying drawings, wherein.

Figure 1:
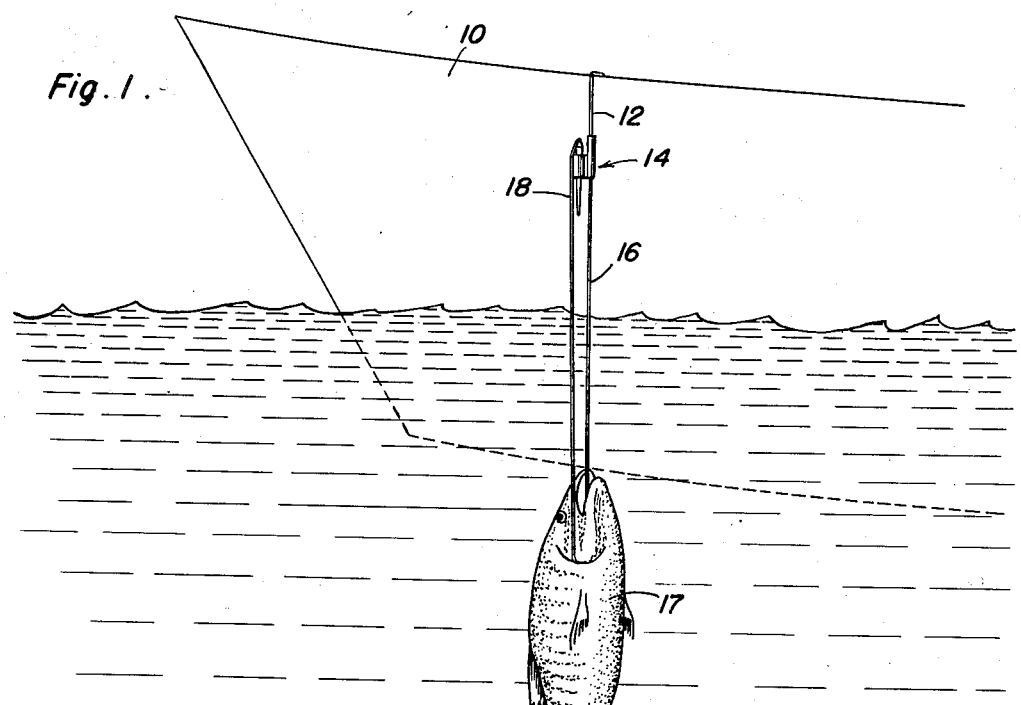
Figure 1 is a side elevational view showing a preferred embodiment of the invention hung from the side of a boat in operative position for securing a string of fish thereto.

Referring now more specifically to the accompanying drawings, wherein like numerals designate similar parts throughout the various views, attention is directed first to Figure 1 wherein there is disclosed a portion of a boat hull 10, from which is mounted the fish stringer forming the subject of this invention.

This fish stringer consists of a flexible cable or cord or like material, having a portion 12, adjacent one end, which is provided with a suitable hook or other means for anchoring the same to the side of the boat 10, this cable being provided with a bracket indicated generally by the numeral 14 of a construction for a purpose to be now set forth.

By means of this bracket, a lower portion of the cable 16 is provided for receiving a fish 17 or a string of fish thereon, and the other end of the cable as at 18 is provided with a tapered terminal 20.

This terminal 20 is preferably in the form of a needle or point, tapering gradually to a blunt point at its outer end, and its rear end being provided with a frusto-conical portion 22 which is adapted to be tightly compressed upon the end of the cable 18, as by rolling over the part 22, upsetting or compressing the same and the like. If desired, the terminal 20 may be of any suitable material, such as metal, a suitable plastic or the like. Preferably, the two tapered surfaces of the needle 20 and its end 22 are such as to permit easy insertion of the needle through the mouth and gills of a fish, as in Figure 1, and likewise to permit ready removal of the same in a reversed direction when it is desired to remove the fish from the string.

Figure 2:
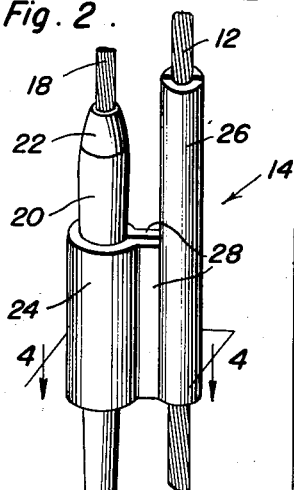
Figure 2 is a fragmentary perspective view of the bracket, showing its mounting upon a flexible cable and showing the cable terminals seated in a socket of the bracket.
Figure 4:
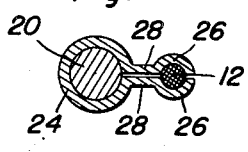

As shown in Figures 2 and 4, the bracket consists of parallel sleeves 24 and 26, which are connected by integrally formed web portions 28. As shown, the sleeve 24 is of relatively shorter length than the sleeve 26, and constitutes a socket which, if desired, may be of tapered configuration on its inner surface, for accommodating the terminal or needle 20. The sleeve 26, is adapted to be frictionally clamped upon and to compressibly embrace the portion 12 of the cable whereby the bracket is rigidly attached to the cable adjacent its upper or supporting end.

Figure 3:
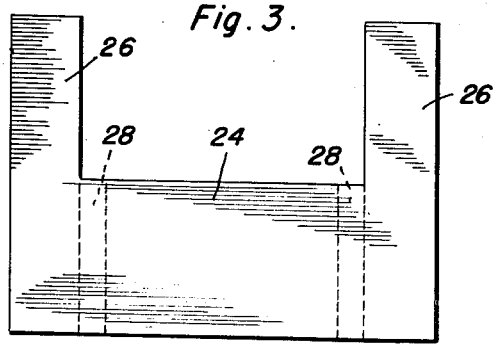
Figure 3 is a plan view of a blank of sheet metal material suitable for forming the bracket forming the subject of this invention; and, Figure 4 is a horizontal sectional detail view taken substantially from the plane of the section line 4—4 of Figure 2.

As will be more readily apparent from Figure 3, the bracket is preferably formed from a single piece of sheet metal material having a relatively narrow central portion 24 and relatively wider end portions 26. As indicated by dotted lines in Figure 3, the web portions 28 are integrally formed between the central portion 24 and the two end portions 26 of the blank.

As will now be understood, the sheet metal blank is folded upon itself to provide the socket sleeve 24, and to position the two webs 28 into juxtaposition with each other as shown in Figures 2 and 4, and whereby the relatively elongated end portions 26 each constitute semi-spherical sleeves of a complementary shape, for compressively embracing the cable 12.

As will be readily understood, it is important that the sleeve 26 be of greater length than the socket sleeve 24, since the frictional clamping action of the bracket upon the cable 12 necessitates the provision of a much larger surface of contact, to prevent slipping of the same.

It will be noted that the weight of the fish upon the portion 16 exerts a downward pull applied to the top portion 22 of the terminal 20, thereby holding the terminal in the socket, and positioning the string of fish in secure but easily removable position on the bracket.

From the foregoing, the construction and operation of the device will be readily understood and further explanation is believed to be unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fish string comprising a cable, a bracket carried by and frictionally embracing said cable intermediate the ends thereof, a socket in said bracket, a pointed tip on one end of said cable, said tip being engageable in said socket, said bracket comprising an integral sheet metal plate, said plate having a portion extending back upon itself to form said socket at the central portion of said plate, the ends of said plate forming complementary semi-cylindrical sleeves for frictionally clamping said cable.

2. The combination of claim 1 wherein said sleeves are of greater length than said socket.

3. The combination of claim 2 including connecting webs on said plate joining said sleeves and said central portion, said webs being disposed in parallel side by side relation.

WILLIAM H. STONICH.

REFERENCES CITED

The following references are of record in the file of this patent:

UNITED STATES PATENTS

| Number | Name | Date |
| --- | --- | --- |
| 878,626 | Guilford | Feb. 11, 1908 |
| 1,346,393 | Woodhouse | July 13, 1920 |
| 1,462,108 | Holywell | July 17, 1923 |
| 2,491,008 | Lake | Dec. 13, 1949 |